L. H. SPIVEY.
ADJUSTABLE LIGHT SHADE AND REFLECTOR.
APPLICATION FILED JUNE 6, 1910.
985,852.
Patented Mar. 7, 1911.
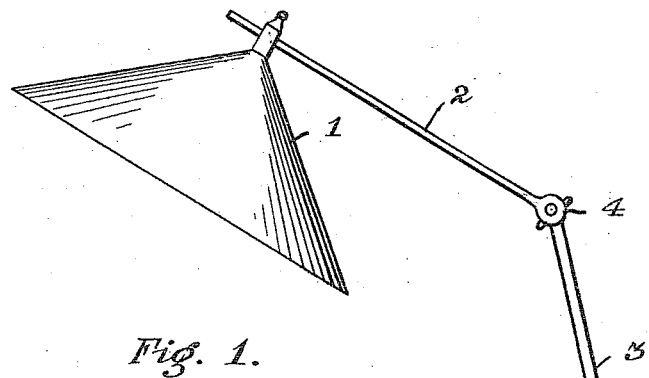
Fig. 1.
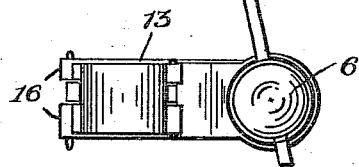
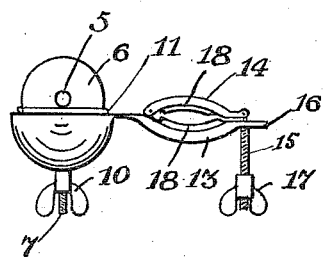
Fig. 2.
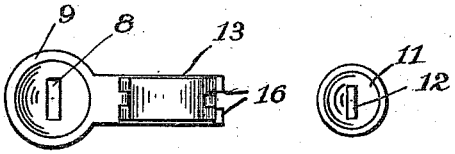
Fig. 3.   Fig. 4.
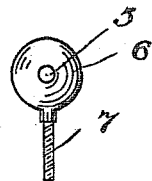
Fig. 5.
WITNESSES:
H. S. Barker
A. Tompkins
INVENTOR
Lillian H. Spivey
BY Hardway & Cathey
ATTORNEYS

UNITED STATES PATENT OFFICE.

LILLIAN HALE SPIVEY, OF ARNIM, TEXAS.

ADJUSTABLE LIGHT SHADE AND REFLECTOR.

985,852.

Specification of Letters Patent. Patented Mar. 7, 1911.

Application filed June 6, 1910. Serial No. 565,316.

*To all whom it may concern:*

Be it known that I, LILLIAN HALE SPIVEY, a citizen of the United States, residing at Arnim, in the county of Wharton and State of Texas, have invented certain new and useful Improvements in Adjustable Light Shades and Reflectors, of which the following is a specification.

My invention relates to new and useful improvements in adjustable light shade and reflector.

The object of the invention resides in the provision of a shade and a support therefor so provided with joints that the shade may be given any desired angle of reflection, relative to the light, and its relative distance from the light may be regulated.

Another object resides in the provision of a clamp member where by the shade may be securely attached to and readily removed from its support.

With the above and other objects in view my invention has particular relation to certain novel features of construction and operation an example of which is given in this specification and illustrated in the accompanying drawings, wherein:—

Figure 1, is a side elevation of the complete device. Fig. 2, is a side elevation of the clamp member and the universal joint carried thereby. Fig. 3, is a plan view of the socket member of the joint and the clamp member carrying the same. Fig. 4, is a plan view of the washer designed to line the joint socket. Fig. 5, represents the ball member of the joint.

Referring now more particularly to the drawings, wherein like numerals of reference designate similar parts in each of the figures, the numeral 1, refers to a light shade which is supported by rods 2, and 3, hingedly secured together by an elbow joint 4. The supporting rod 3, is secured to its support in the manner presently to be described. This rod is designed to extend through the opening 5, in the ball 6, as shown in Fig. 1. This ball is provided with a projecting rod 7, which extends through an elongated slot 8, in the socket member 9, and is outwardly threaded to receive the thumb screw 10, by means of which the ball is secured in its socket.

The numeral 11, refers to a washer concaved so as to conform to the socket 9, and designed to be interposed between said socket and ball 6. This washer is provided with an elongated slot 12, designed to register with slot 8, and receive the rod 7, and its rim projects beyond the socket member 9, as shown in Fig. 2, and rests against the rod 3, and holds said socket member from contact with said rod.

The numeral 13, designates a laterally extending arcuate clamp member which is integral with the socket member 9, and to which the member 14, similarly shaped is hingedly secured as shown in Fig. 2. The free end of member 14, carries a rod 15, hingedly secured thereto, which is designed to extend between the bifurcated extensions 16, of member 13, and is outwardly threaded to receive a thumb screw 17, which may be screwed down against the extensions 16, and the members 13, and 14, thus secured around the supporting arm of the support. The concaved sides of these members are lined with a suitable packing material 18, which insures a firm grip of the clamp members around their supporting arm and prevents the wear of said arm. When it is desired to elevate or lower the shade on the supporting arm the thumb screw 17, may be loosened and the desired movement effected and when it is desired to entirely remove the shade the screw 17, may be loosened sufficiently to permit rod 17, to pass entirely from between the extensions 16, and the attachment be removed.

It is obvious that the peculiar construction of the universal joint formed by the union of a ball 6, and socket 9, will provide a joint freely movable, as the socket is held from contact and friction with rod 3, by reason of washer 11 and as the ball is allowed a limited rocking movement in its socket by reason of the elongated slots 8, and 12, in which the rod 7, is permitted to move.

A shade and reflector constructed in accordance with the foregoing specification and the drawings accompanying the same will be found to be capable of a ready adjustment, and will be easily attached to or removed from the support on which it is to be secured.

What I claim is:—

1. A device of the character described including a shade support and a device for securing the same to a stationary body, said securing means being composed of a socket member and a laterally extending clamp member carried thereby, a spherical body slidingly secured on the shade support and also secured in said socket member, and a means for securing said clamp member to the body to which the same is designed to be attached.

2. In a device of the character described a shade and a means for securing the same to a stationary body, said means including a clamping device; a socket member carried thereby; a ball, to which said shade is secured, seated in the socket member; a means interposed between said ball and socket member for permitting the free movement of one relative to the other and a means for regulating the freedom of movement of said elements relative to each other.

3. In a device of the character described a universal joint, said joint comprising a socket member and a removable lining therefor, said member and lining each being provided with an elongated slot, said slots registering with each other, a ball, the said ball being provided with a projection which extends, normally through said slots, a clamp member carried by the said socket members, an adjustable rod passing through the said ball, a shade carried by said rod, and means for securing the said shade on the said rod.

4. A device of the character described composed of the following elements:—a shade and a support therefor; a ball to which said support is secured; a socket member within which said ball seats; a means for securing said ball in its seat; a removable socket lining interposed between the ball and seat; a clamp member for securing said socket member to a support; a hinge member, attached to the clamp member and designed to engage around said support and a means for securing the free ends of the clamp members and hinge member together.

5. A device of the character described including a shade support and a device for securing the same to a stationary body said securing means being composed of a socket member and a laterally extending clamp member carried thereby, a spherical body slidingly secured on the shade support and also secured in said socket member, a means interposed between said spherical body and said socket member for permitting the free movement of one relative to the other, and a means for securing said clamp member to the body to which the same is to be secured.

In testimony whereof I have signed my name to this specification in the presence of two subscribing witnesses.

LILLIAN HALE SPIVEY.

Witnesses:
C. M. SHIPMAN.
F. M. RYAN.

---

Copies of this patent may be obtained for five cents each, by addressing the "Commissioner of Patents, Washington, D. C."